US012609416B2

(12) United States Patent  
Kishida et al.

(10) Patent No.: US 12,609,416 B2  
(45) Date of Patent: Apr. 21, 2026

(54) BATTERY MODULE

(71) Applicants: SANYO Electric Co., Ltd., Kadoma (JP); Panasonic Holdings Corporation, Kadoma (JP)

(72) Inventors: Yuji Kishida, Osaka (JP); Tatsuya Hirano, Osaka (JP); Kazutoshi Kohira, Hyogo (JP)

(73) Assignees: PANASONIC ENERGY CO., LTD., Osaka (JP); PANASONIC HOLDINGS CORPORATION, Osaka (JP)

( * ) Notice: Subject to any disclaimer, the term of this patent is extended or adjusted under 35 U.S.C. 154(b) by 559 days.

(21) Appl. No.: 18/021,264

(22) PCT Filed: Sep. 17, 2021

(86) PCT No.: PCT/JP2021/034221  
§ 371 (c)(1),  
(2) Date: Feb. 14, 2023

(87) PCT Pub. No.: WO2022/065211  
PCT Pub. Date: Mar. 31, 2022

(65) Prior Publication Data  
US 2023/0299427 A1     Sep. 21, 2023

(30) Foreign Application Priority Data  
Sep. 25, 2020    (JP) ................................. 2020-161273

(51) Int. Cl.  
*H01M 50/503*     (2021.01)  
*H01M 50/213*     (2021.01)  
(Continued)

(52) U.S. Cl.  
CPC ....... *H01M 50/503* (2021.01); *H01M 50/213* (2021.01); *H01M 50/3425* (2021.01); *H01M 50/516* (2021.01)

(58) Field of Classification Search  
None  
See application file for complete search history.

(56) References Cited

U.S. PATENT DOCUMENTS

| | | | |
|---|---|---|---|
| 6,218,807 B1 * | 4/2001 | Sakaue | H02J 7/0042 |
| | | | 320/107 |
| 2011/0171505 A1 * | 7/2011 | Kishll | H01M 50/583 |
| | | | 429/82 |

(Continued)

FOREIGN PATENT DOCUMENTS

| | | |
|---|---|---|
| EP | 2339672 A1 | 6/2011 |
| EP | 3419083 A1 | 12/2018 |

(Continued)

OTHER PUBLICATIONS

Extended (Supplementary) European Search Report dated Jan. 29, 2024, issued in counterpart EP application No. 21872340.1. (7 pages).

(Continued)

*Primary Examiner* — Scott J. Chmielecki  
(74) *Attorney, Agent, or Firm* — WHDA, LLP

(57) ABSTRACT

A battery module includes a plurality of cylindrical batteries and lead plate connected to cylindrical batteries and electrically connecting the plurality of cylindrical batteries. Cylindrical battery includes can bottom valve including a thin-walled line ruptured and opening an exhaust port when an internal pressure of an outer covering can becomes higher than a threshold pressure. Lead plate includes double-supported arm arranged opposing a can bottom of cylindrical battery and coupled to lead plate at both ends at a position opposing can bottom valve, and gas permeation gap of exhaust gas ejected from the exhaust port on both sides of double-supported arm.

15 Claims, 8 Drawing Sheets

(51) Int. Cl.
_H01M 50/342_ (2021.01)
_H01M 50/516_ (2021.01)

(56) References Cited

U.S. PATENT DOCUMENTS

| | | | |
|---|---|---|---|
| 2015/0064514 A1* | 3/2015 | Wu | H01M 50/293 |
| | | | 429/120 |
| 2015/0132625 A1 | 5/2015 | Miyata et al. | |
| 2017/0047566 A1 | 2/2017 | Okuda et al. | |
| 2018/0351219 A1* | 12/2018 | Smith | H01M 50/30 |
| 2019/0207184 A1* | 7/2019 | Koutari | H01M 50/534 |
| 2020/0280030 A1* | 9/2020 | Waha | H01M 50/358 |
| 2020/0280040 A1* | 9/2020 | Lee | H01M 50/204 |
| 2020/0313129 A1* | 10/2020 | Koutari | H01M 50/3425 |
| 2022/0077540 A1* | 3/2022 | Wakabayashi | H01M 50/394 |
| 2022/0263185 A1* | 8/2022 | Kurihara | H01M 50/317 |
| 2023/0126646 A1* | 4/2023 | Yoon | H01M 50/213 |
| | | | 429/82 |

FOREIGN PATENT DOCUMENTS

| | | | | |
|---|---|---|---|---|
| EP | 3249716 B1 * | 1/2020 | ........ | H01M 50/3425 |
| EP | 3696882 A1 * | 8/2020 | ........ | H01M 10/0422 |
| JP | 5737481 B2 | 6/2015 | | |
| JP | 2017-84603 A | 5/2017 | | |
| JP | 2018-77932 A | 5/2018 | | |
| JP | 2018-174147 A | 11/2018 | | |
| WO | 2016/009586 A1 | 1/2016 | | |
| WO | 2018/003291 A1 | 1/2018 | | |

OTHER PUBLICATIONS

International Search Report dated Nov. 9, 2021, issued in counterpart International Application No. PCT/JP2021/034221 (2 pages).

* cited by examiner

BATTERY MODULE

CROSS-REFERENCE TO RELATED APPLICATIONS

This application is a National Phase Application filed under 35 U.S.C. §371 of International Application No. PCT/JP2021/034221 filed on Sep. 17, 2021 which claims the benefit of priority under 35 U.S.C. § 119(a) of Japanese Patent Application No. 2020-161273 filed in Japan on Sep. 25, 2020, the contents of which are incorporated herein by reference.

TECHNICAL FIELD

The present invention relates to a battery module in which cylindrical batteries are connected by a metal lead plate, and particularly relates to a battery module in which cylindrical batteries provided with can bottom valves are connected by a lead plate.

BACKGROUND ART

A battery module is developed in which a lead plate is welded to an electrode terminal at an end part to connect a plurality of cylindrical batteries in series or in parallel. (See PTLs 1 and 2)

In the battery modules described in these publications, a plurality of cylindrical batteries are in parallel, and electrode surfaces at both ends are arranged on the same planes. Lead plates arranged on both end surfaces of the cylindrical battery are provided with connection arms, and tips of the connection arms are welded to electrode terminals.

In the battery module described above, the cylindrical battery is provided with a can bottom valve in order to prevent the cylindrical battery from being ruptured due to the internal pressure of the cylindrical battery becoming abnormally high because of an internal short circuit, for example. The can bottom valve opens when the internal pressure becomes higher than a threshold pressure to prevent an abnormal internal pressure rise. In particular, in a non-aqueous electrolyte secondary battery such as a lithium ion battery, an internal pressure instantaneously rises when thermal runaway occurs due to an internal short circuit or the like, and thus, the can bottom valve is provided to quickly exhaust an exhaust.

The can bottom valve is annularly provided with a thin-walled line on the can bottom, and the thin-walled line is ruptured and opened by an internal pressure rise. The can bottom valve with this structure can suppress a rapid internal pressure rise by increasing the opening area. However, in this can bottom valve, a solid exhaust such as an electrode constituent material is ejected together with a high temperature gas from an exhaust port that is largely opened, and this causes various adverse effects. For example, when a conductive solid exhaust is exhausted from the cylindrical battery into the case of the battery module, the solid exhaust comes into contact with the conductive part exposed in the case to cause a short circuit. Furthermore, since the can bottom valve is opened in an abnormal state such as thermal runaway, the temperature of the solid exhaust exhausted from the can bottom is an abnormally high temperature exceeding 500° C., and when the solid exhaust is exhausted into the case, it also causes thermal failure.

CITATION LIST

Patent Literature

PTL 1: Japanese Patent No. 5737481
PTL 2: Unexamined Japanese Patent Publication No. 2017-84603

SUMMARY OF THE INVENTION

The present invention has been developed for the purpose of preventing the above adverse effects, and an important object of the present invention is to provide a battery module capable of achieving higher safety by preventing adverse effects due to solid exhaust from a can bottom valve to be opened.

A battery module according to an aspect of the present invention includes: a plurality of cylindrical batteries; and a lead plate connected to the cylindrical battery and provided with the plurality of cylindrical batteries that are electrically connected. The cylindrical battery includes a can bottom valve including a thin-walled line that is ruptured and opens an exhaust port when an internal pressure of an outer covering can becomes higher than a threshold pressure. The lead plate includes a double-supported arm arranged opposing a can bottom of the cylindrical battery and coupled to the lead plate at both ends at a position opposing the can bottom valve, and a gas permeation gap of exhaust gas ejected from the exhaust port on both sides of the double-supported arm.

The battery module described above achieves higher safety by preventing adverse effects due to a high-temperature solid exhaust exhausted from the can bottom valve to be opened.

DESCRIPTION OF EMBODIMENT

Figure 1:
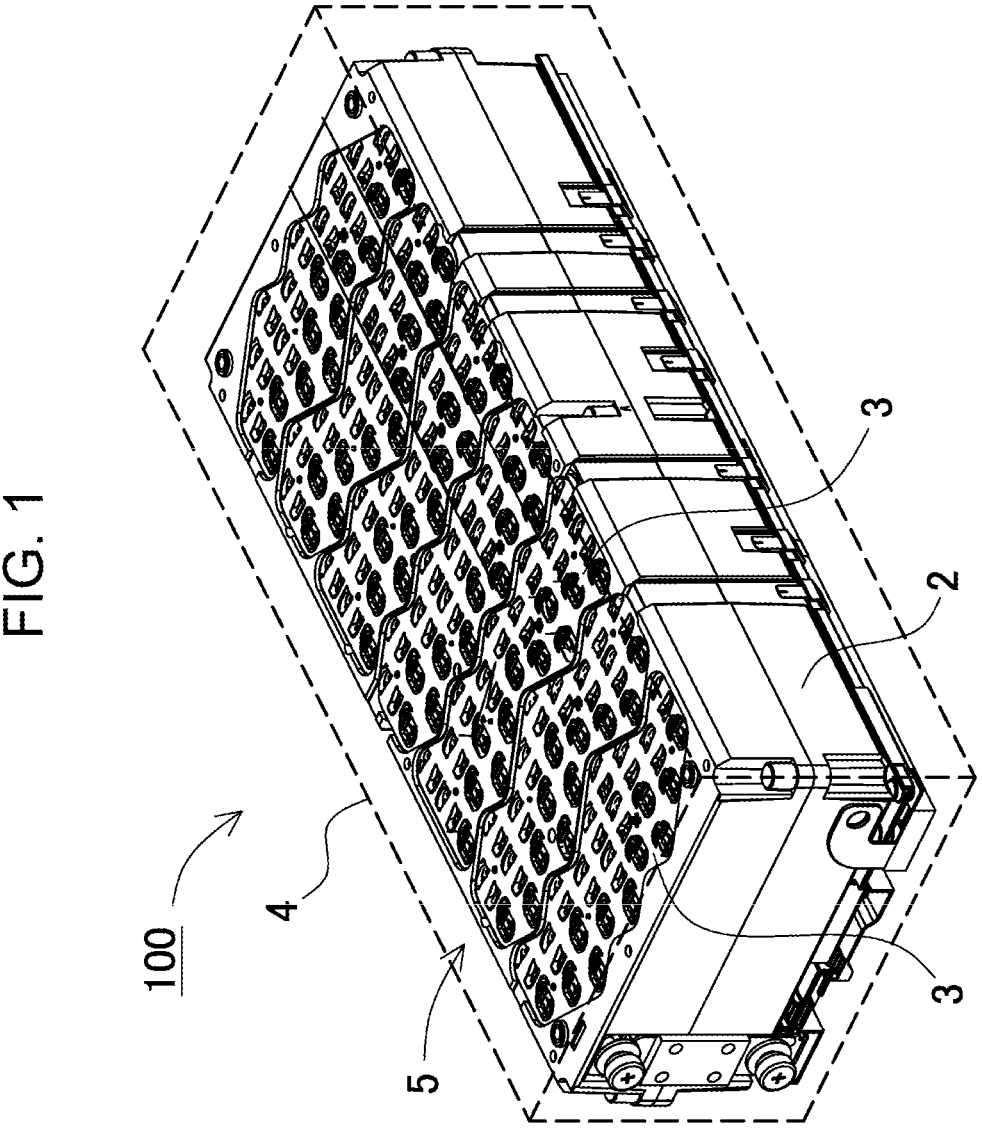
FIG. 1 is a perspective view of a battery module according to an exemplary embodiment of the present invention.

A battery module of an exemplary embodiment of the present invention is a battery module including: a plurality of cylindrical batteries; and a lead plate connected to the cylindrical battery and provided with the plurality of cylindrical batteries that are electrically connected in which the cylindrical battery includes a can bottom valve including a thin-walled line that is ruptured and opens an exhaust port when an internal pressure of an outer covering can becomes higher than a threshold pressure, and the lead plate includes a double-supported arm arranged opposing a can bottom of the cylindrical battery and coupled to the lead plate at both ends at a position opposing the can bottom valve, and a gas permeation gap of exhaust gas ejected from the exhaust port on both sides of the double-supported arm.

By allowing a high-temperature exhaust gas exhausted from the can bottom valve on the can bottom to permeate a gas permeation gap of the lead plate, and preventing, with the lead plate, permeation of the high-temperature solid exhaust, the above configuration achieves high safety, which is an extremely important characteristic as a battery module. This is because, in the battery module described above, the lead plate arranged at the position opposing the can bottom of the cylindrical battery is provided with a double-supported arm having both ends coupled to the lead plate at the position opposing the can bottom valve, and the both sides of the double-supported arm are provided with a gas permeation gap. Since both ends of the double-supported arm are coupled to the lead plate, the double-supported arm is not ruptured by an impact of the high-temperature exhaust vigorously ejected from the can bottom valve, and blocks a solid exhaust contained in the exhaust from permeating the lead plate, and the gas permeation gaps provided on both sides of the double-supported arm allow the high-temperature exhaust gas contained in the exhaust to pass through and prevent a rapid internal pressure rise in the battery. The can bottom valve to be opened ejects a high-temperature exhaust in which both the exhaust gas and the solid exhaust are mixed, and blocking the solid exhaust from permeating while allowing the high-temperature exhaust gas to permeate the gas permeation gaps on both sides of the double-supported arm. Since the internal pressure of the cylindrical battery instantaneously rises due to thermal runaway or the like, it is important to quickly exhaust the exhaust gas from the opened can bottom valve. In a structure not capable of smoothly exhausting the exhaust gas, the internal pressure of the cylindrical battery rapidly rises, and the safety cannot be secured. The battery module described above has an advantage that the exhaust gas exhausted from the can bottom valve can be exhausted quickly in a well-balanced manner into the gas permeation gaps provided on both sides of the double-supported arm, and thus an internal pressure rise of the cylindrical battery can be reliably suppress. Furthermore, the high-temperature solid exhaust exhausted together with the exhaust gas is blocked from permeating the lead plate with the double-supported arm to prevent failure by the solid exhaust, but since the double-supported arm is coupled to the lead plate at the both ends, the permeation of the solid exhaust is reliably blocked with the double-supported arm not deformed by the vigorously ejected exhaust.

In a battery module of another exemplary embodiment of the present invention, the double-supported arm is arranged elongating in a diametrical direction of the can bottom having a circular shape.

Since the double-supported arm is arranged in the diametrical direction of the can bottom and the double-supported arm is arranged at the center of the circular can bottom, the battery module described above more effectively prevents the passage of the solid exhaust exhausted from the opened can bottom valve, and achieves higher safety.

In a battery module of another exemplary embodiment of the present invention, the lead plate includes connection arms provided by welding to a can bottom on both sides of the double-supported arm, a gas permeation gap is provided between the double-supported arm and the connection arm, and the connection arm is a cantilever arm having one end coupled to the lead plate, the connection arm having a tip welded to the can bottom.

Since the cantilever connection arm having one end coupled to the lead plate is welded to the can bottom where the double-supported arm is arranged at the opposing position, and the gas permeation gap is provided between the connection arm and the double-supported arm, the battery module described above has a characteristic that the double-supported arm is arranged on the bottom without positional displacement on both sides by the connection arm welded to the can bottom, and the double-supported arm can reliably block the solid exhaust from passing through.

In a battery module of another exemplary embodiment of the present invention, the cantilever connection arm is welded to the can bottom outside a thin-walled line that is annular.

The above battery module has an advantage of being capable of stably opening the can bottom valve with a large opening area while more reliably preventing positional displacement of the double-supported arm by the cantilever connection arm, while welding the cantilever connection arm to the can bottom to electrically connect the lead plate to the cylindrical battery. This is because the can bottom valve ruptures the thin-walled line and the cantilever connection arm opens the ruptured annular inner side that is not welded, thereby exhausting the exhaust gas.

In a battery module of another exemplary embodiment of the present invention, the cylindrical battery is provided with a can bottom valve on a can bottom of an outer covering can and an exhaust valve on a sealing plate formed by closing an opening of the outer covering can.

The battery module described above has an advantage of being capable of quickly exhausting the exhaust gas from the can bottom valve and the exhaust valve provided at both ends of the cylindrical battery, and more effectively suppressing an internal pressure rise of the battery.

In a battery module of another exemplary embodiment of the present invention, a lateral width of the double-supported arm is greater than or equal to 1.5 mm.

The battery module described above has an advantage of being capable of more reliably blocking, with the lead plate, permeation of the solid exhaust exhausted from the can bottom valve, with the double-supported arm having sufficient strength.

In a battery module of another exemplary embodiment of the present invention, opening width (K) of the gas permeation gap in plan view is less than or equal to 5 mm.

Since opening width (K) of the gas permeation gap is made less than or equal to 5 mm, the battery module described above has an advantage of being capable of more reliably blocking the solid exhaust exhausted from the can bottom valve from permeating the gas permeation gap.

In a battery module of another exemplary embodiment of the present invention, the cylindrical battery is a non-aqueous electrolyte secondary battery.

The battery module described above has an advantage of being capable of securing high safety while increasing a charging and exhausting capacity with respect to a weight and a volume by using a non-aqueous electrolyte secondary battery such as a lithium ion battery that ejects a high-temperature, high-pressure exhaust by thermal runaway.

Hereinafter, the present invention will be described in detail with reference to the drawings. Note that, in the following description, terms (e.g., "top/up/above/over", "bottom/down/below/under", and other terms including those terms) indicating specific directions or positions are used as necessary; however, the use of those terms is for facilitating the understanding of the invention with reference to the drawings, and the technical scope of the present invention is not limited by the meanings of the terms. Parts denoted by the same reference marks in a plurality of drawings indicate the same or equivalent parts or members. Furthermore, an exemplary embodiment described below illustrates a specific example of the technical idea of the present invention, and the present invention is not limited to the exemplary embodiment below. Unless otherwise specified, dimensions, materials, shapes, relative arrangements, and the like of the configuration components described below are not intended to limit the scope of the present invention only to them, but are intended to be illustrative. The content described in one exemplary embodiment or example are also applicable to other exemplary embodiments and examples. The sizes, positional relationships, and the like of members illustrated in the drawings may be exaggerated in order to clarify description.

In a conventional battery module including a plurality of cylindrical batteries, a lead plate is welded to an electrode terminal to connect the cylindrical batteries in series or in parallel. Since both ends of the cylindrical battery are electrode terminals, a lead plate is arranged opposing to electrode surfaces at both ends, and a connection arm provided on the lead plate is welded to each of the electrode surfaces. The lead plate is obtained by cutting a deformable thin metal plate, providing a cantilever connection arm having one end coupled to the lead plate, and welding a tip of the connection arm to the cylindrical battery. In the cylindrical battery connected to this lead plate, can bottom valves are provided at both ends near a protrusion electrode and a can bottom in order to more effectively suppress an internal pressure rise. Since a slit-shaped exhaust port is provided around the protrusion electrode, the can bottom valve provided near the protrusion electrode is restricted by the opening area. On the other hand, the can bottom valve on the can bottom is opened larger than that near the protrusion electrode, and the exhaust gas can be more smoothly exhausted to effectively suppress the internal pressure rise.

The can bottom valve of the can bottom is largely opened, and the exhaust can be smoothly exhausted from the thermally runaway cylindrical battery, but the solid exhaust is exhausted into the case, which causes various adverse effects. In the battery module, the connection arm of the lead plate is arranged at a position opposing the can bottom of the cylindrical battery, but the connection arm cannot block permeation of the solid exhaust ejected from the can bottom valve, and the solid exhaust passes through the lead plate and is exhausted into the case, which causes various adverse effects. The lead plate cannot block the permeation of the solid exhaust because the connection arm has a cantilever structure in which one end is laminated on the lead plate and the connection arm is deformed by vigorously ejected solid exhaust.

Hereinafter, a battery module will be described in detail in which a lead plate capable of blocking passage of a solid exhaust vigorously ejected from an opened can bottom valve is connected to a can bottom of a cylindrical battery having the can bottom valve.

First Exemplary Embodiment

Figure 2:
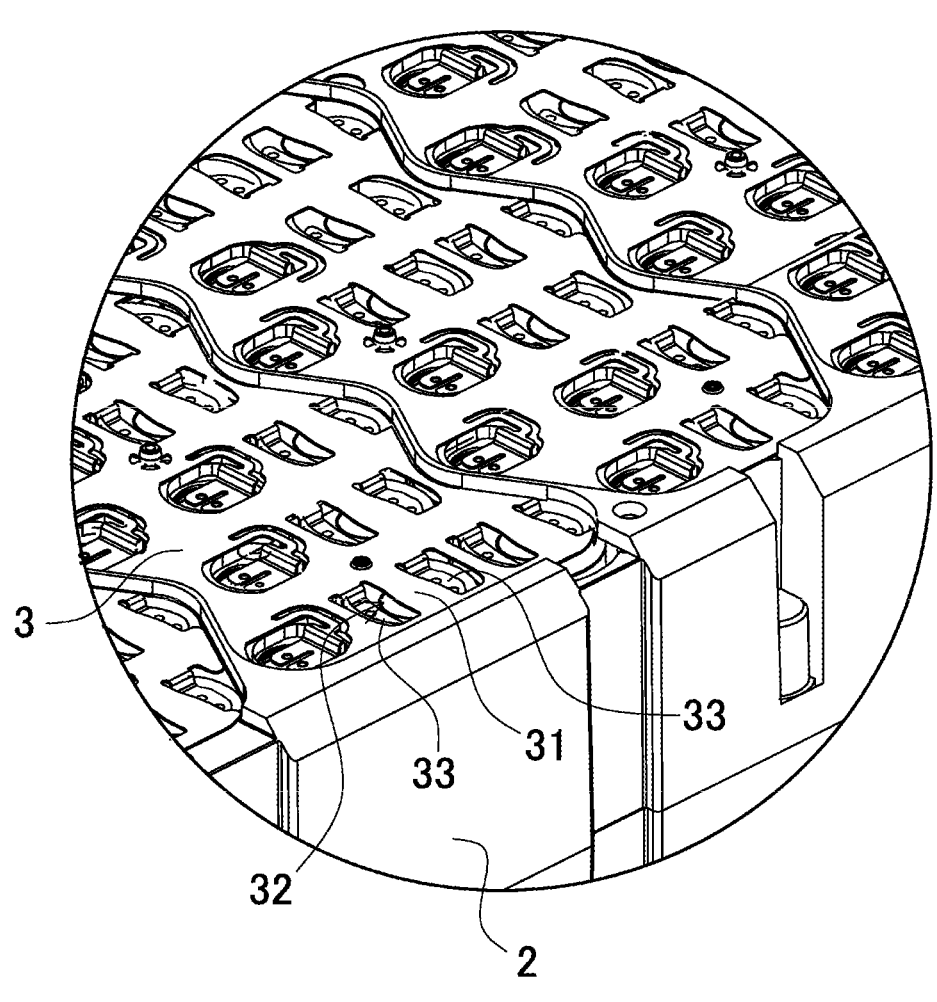
FIG. 2 is an enlarged perspective view of a battery unit of the battery module illustrated in FIG. 1.
Figure 3:
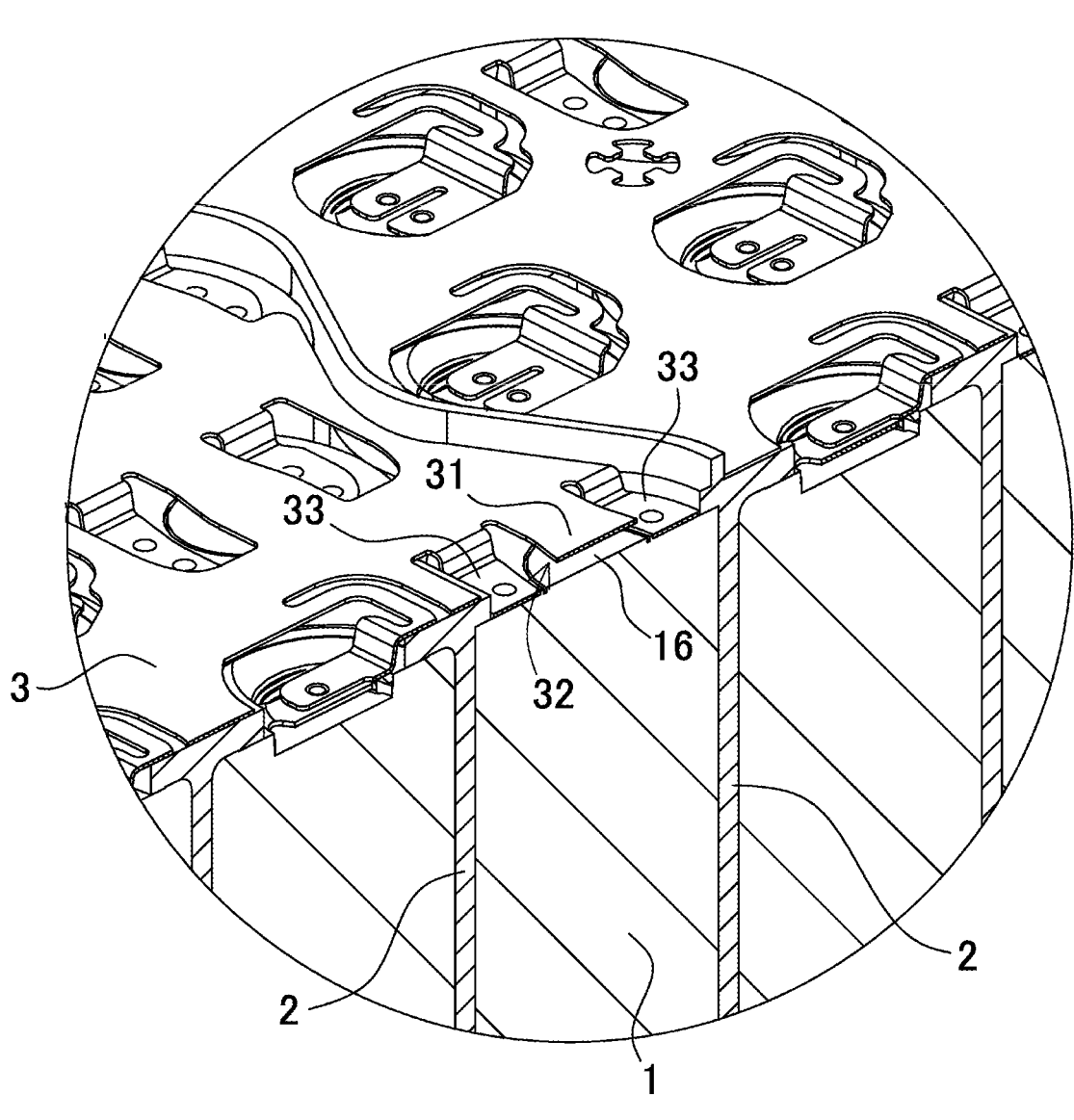
FIG. 3 is a schematic sectional perspective view of the battery unit illustrated in FIG. 2.
Figure 4:
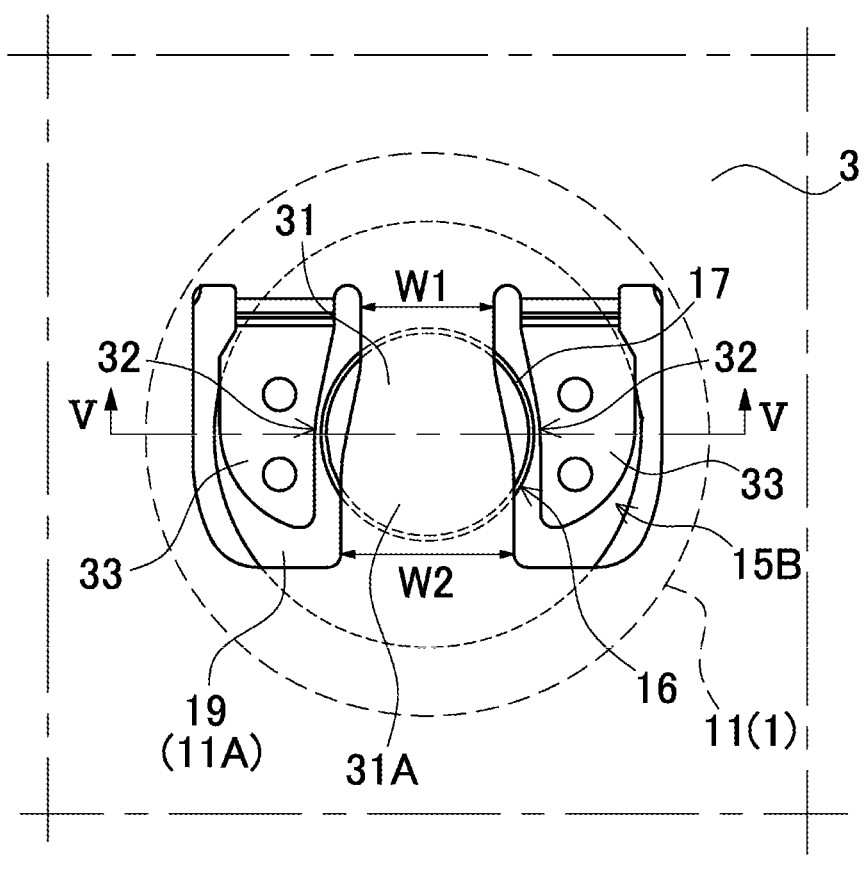
FIG. 4 is an enlarged plan view of the battery unit illustrated in FIG. 2.
Figure 5:
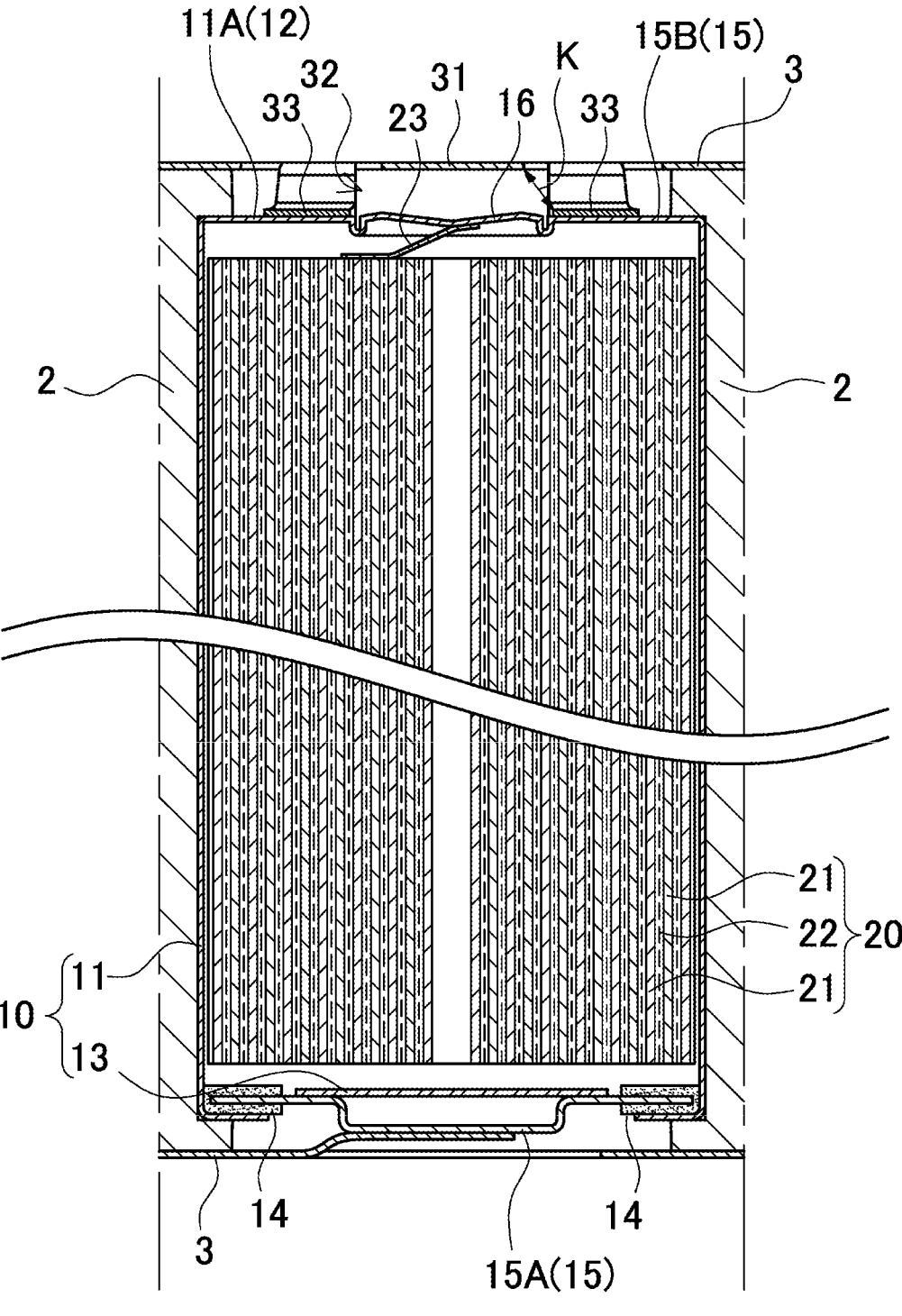
FIG. 5 is a vertical sectional view taken along line V-V of the battery unit illustrated in FIG. 4.

FIGS. 1 to 5 illustrate a battery module according to an exemplary embodiment of the present invention. FIG. 1 illustrates a perspective view of battery module 100, FIGS. 2 and 3 illustrate an enlarged perspective view and an enlarged sectional perspective view of battery module 100 illustrated in FIG. 1, respectively, and FIGS. 4 and 5 illustrate an enlarged plan view and an enlarged vertical sectional view of the battery module illustrated in FIG. 2, respectively. In battery module 100 illustrated in these drawings, battery unit 4 includes a plurality of cylindrical batteries 1 and lead plate 3 connected to cylindrical batteries 1 and connecting adjacent cylindrical batteries 1 in series or in parallel, and this battery unit is housed in exterior case 5.

[Cylindrical battery 1] Cylindrical battery 1 preferably uses a non-aqueous electrolytic solution battery such as a lithium ion battery. Since the lithium ion battery has a large capacity with respect to weight and capacity, battery module 100 using cylindrical battery 1 as a lithium ion battery can be reduced in size and weight and can have a large charging and exhausting capacity. However, the present invention does not specify cylindrical battery 1 as a non-aqueous electrolyte solution battery, and cylindrical battery 1 may be another cylindrical battery 1 including a can bottom valve that opens when the internal pressure rises to a threshold pressure.

Figure 6:
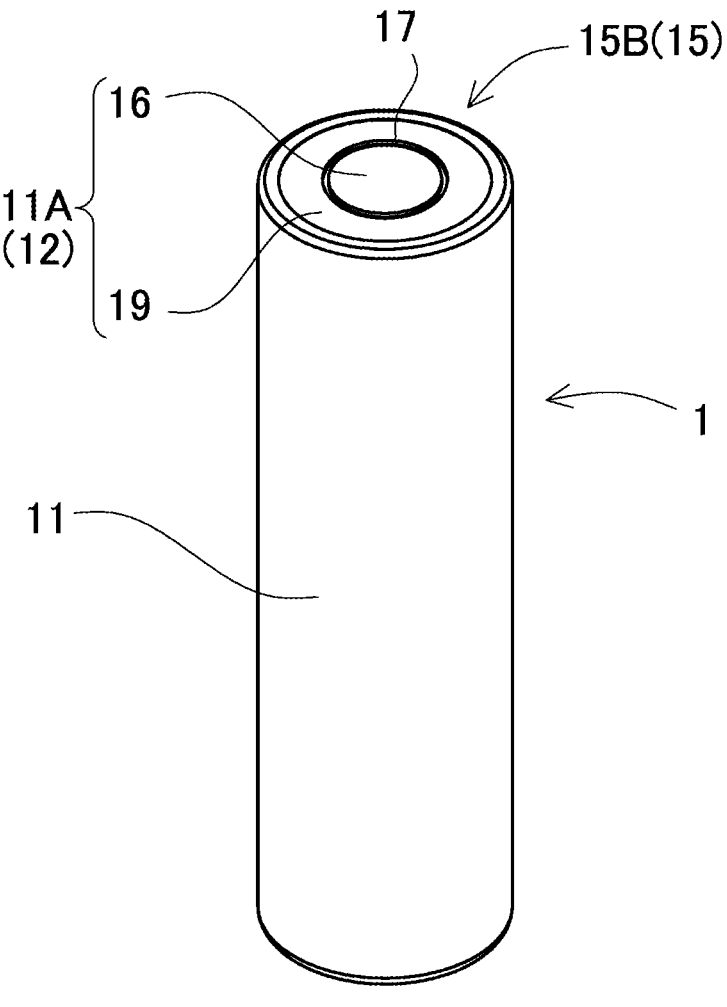
FIG. 6 is a perspective view illustrating an example of a cylindrical battery.

As illustrated in the enlarged sectional view of FIG. 5 and the perspective view of FIG. 6, cylindrical battery 1 is provided with can bottom valve 16 that opens when the internal pressure of outer covering can 11 increases. When the internal pressure exceeds a threshold pressure due to thermal runaway or the like, can bottom valve 16 opens and exhausts high-temperature content. An exhaust gas and a solid exhaust are mixed in the high-temperature exhaust exhausted from opened can bottom valve 16, and it is important to allow the exhaust gas to smoothly permeate lead plate 3 to exhaust. Lead plate 3 that does not allow the exhaust gas to smoothly permeate therethrough becomes close to a state of substantially closing the opening of can bottom valve 16, and raises the internal pressure of cylindrical battery 1, which hinders the safety of cylindrical battery 1. Lead plate 3 is required to have a characteristic that allows exhaust gas to smoothly permeate lead plate 3 and block passing of solid exhaust. This is because when the solid exhaust permeates lead plate 3, the solid exhaust enters between lead plate 3 and battery case 2, which causes various adverse effects. It is because, for example, when the solid exhaust permeates lead plate 3 and comes into contact with a conductive exposed part, an excessive short-circuit current flows inside lead plate 3, which hinders safety.

As illustrated in FIG. 5, in cylindrical battery 1, spiral electrode 20 formed by laminating positive and negative electrode plates 21 with separator 22 interposed is housed in metal battery can 10 and filled with an electrolyte solution. In battery can 10, an opening of cylindrical outer covering can 11 closing can bottom 12 with bottom plate 11A is sealed with sealing plate 13. Sealing plate 13 is insulated and airtightly fixed to outer covering can 11 with insulating material 14 interposed. Cylindrical battery 1 is provided with electrodes 15 at both ends in the longitudinal direction. In cylindrical battery 1 of a lithium ion battery, protrusion electrode 15A provided on sealing plate 13 is a positive electrode, and bottom electrode 15B provided on bottom plate 11A of outer covering can 11 is a negative electrode. As cylindrical battery 1, it is possible to use is a lithium ion battery commonly called "18650" having a diameter of 18 mm and a total length of 65 mm, or a lithium ion battery having a dimension close to or larger than this.

In cylindrical battery 1, spiral electrode 20 to be housed is connected to protrusion electrode 15A of sealing plate 13 and bottom electrode 15B of bottom plate 11A with internal tab 23 interposed. Internal tab 23 connecting the bottom electrode 15B to spiral electrode 20 can have a strength with which internal tab 23 is ruptured in an open state of can bottom valve 16. As internal tab 23, a metal plate or a metal foil thinner than bottom plate 11A or a thin conductive wire is used. In cylindrical battery 1 illustrated in the sectional view of FIG. 5, internal tab 23 is welded and connected to the center of bottom plate 11A.

Internal tab 23, which is ruptured in the open state of can bottom valve 16, can particularly largely open can bottom valve 16. However, internal tab 23 does not necessarily have a strength with which internal tab 23 is ruptured in the open state of can bottom valve 16. Unruptured internal tab 23 is pulled and deformed by can bottom valve 16 to be opened. In particular, since internal tab 23 is coupled to can bottom valve 16 in a somewhat loosened state, the internal tab is linearly pulled to increase the opening degree of can bottom valve 16 in the open state of can bottom valve 16 even in a non-ruptured state.

Figure 7:
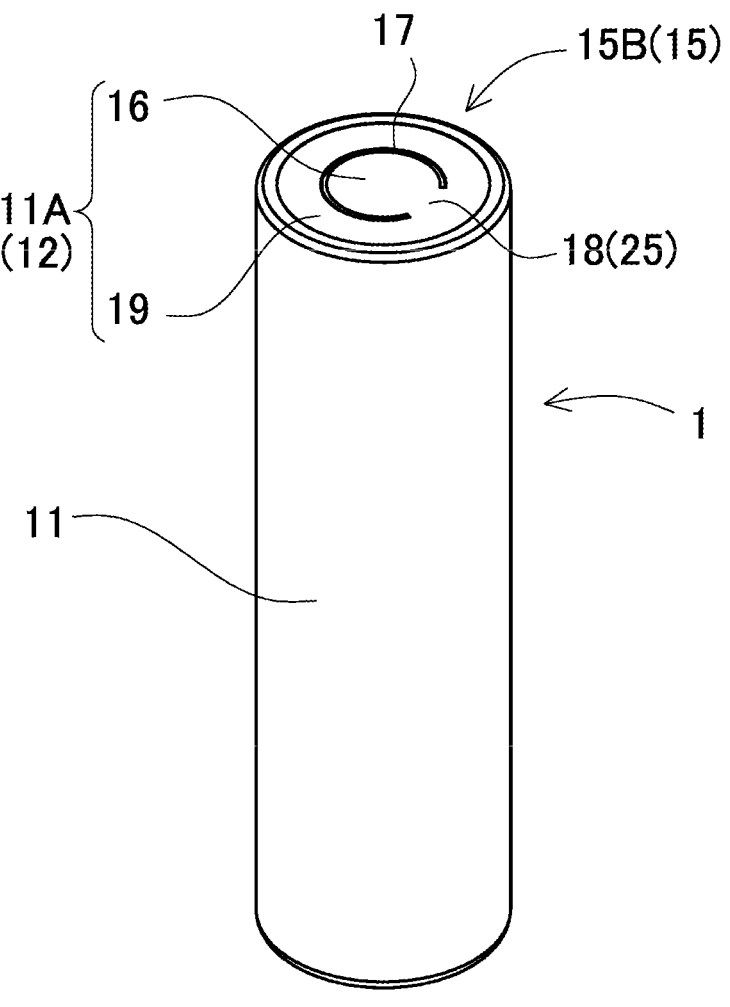
FIG. 7 is a perspective view illustrating another example of a cylindrical battery.
Figure 8:
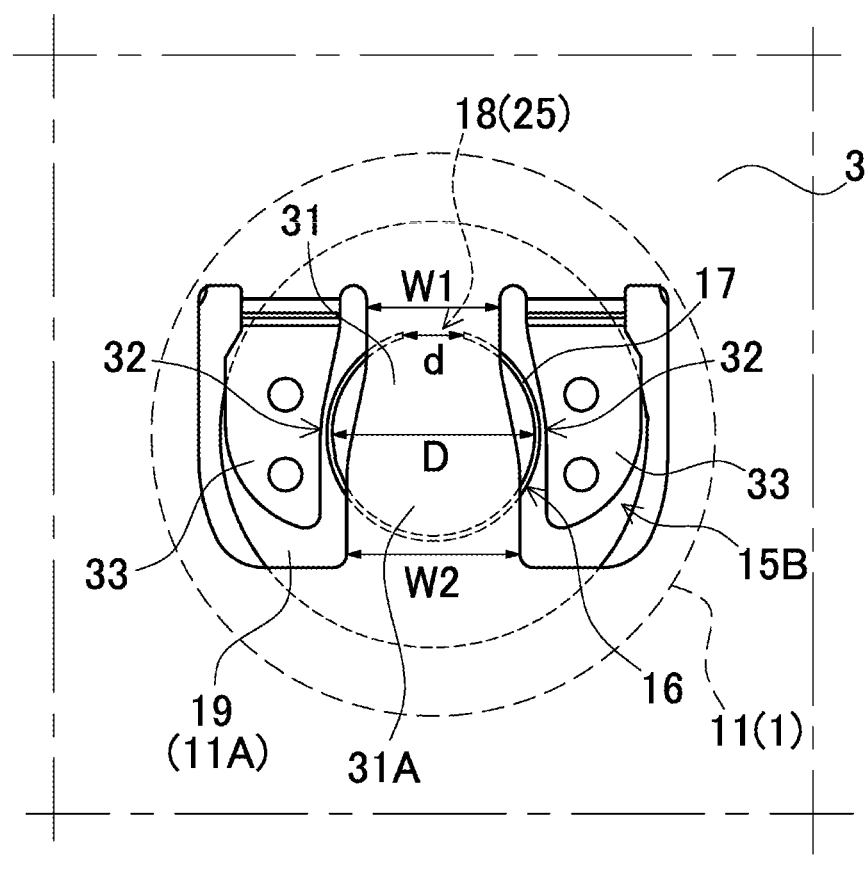
FIG. 8 is an enlarged plan view of a battery unit including the cylindrical battery illustrated in FIG. 7.

Can bottom 12 of cylindrical battery 1 is provided with annular thin-walled line 17 that is ruptured at a threshold pressure. In cylindrical battery 1 of FIG. 6, thin-walled line 17 is provided in a continuous circular shape to form can bottom valve 16, but the entire thin-walled line 17 is ruptured when can bottom valve 16 is opened, and can be largely opened. However, in the can bottom valve, the thin-walled line is not necessarily provided in a continuous annular shape, and as illustrated in FIGS. 7 and 8, a part may be coupled to can bottom 12 to provide non-coupled part 18 as hinge part 25. In can bottom valve 16, since hinge part 25 is coupled to bottom plate 11A, thin-walled line 17 is ruptured, and hinge part 25 is deformed and opened. Cylindrical battery 1 illustrated in the perspective view of FIG. 7 and the plan view of FIG. 8 is provided with C-shaped thin-walled line 17 concentrically with circular can bottom 12, and is provided with loop-shaped thin-walled line 17 having non-coupled part 18. In cylindrical battery 1 of the figure, loop-shaped thin-walled line 17 having non-coupled part 18 is in a C shape, but thin-walled line 17 is not specified in this shape, and may be formed in, for example, a horseshoe shape, a U shape, or a shape in which the tip of the U shape is provided with ribs approaching each other. In can bottom valve 16, the lateral width of can bottom valve 16 is wider than the lateral width of hinge part 25, in other words, lateral width (D) of can bottom valve 16 is wider than interval (d) of non-coupled part 18, so that thin-walled line 17 is easily opened in a ruptured state, and the opening area at the time of valve opening is increased.

The threshold pressure at which can bottom valve 16 opened due to rupture of thin-walled line 17 is opened is specified by the material of outer covering can 11 and the thickness of thin-walled line 17. In iron outer covering can 11, the thickness of thin-walled line 17 is made, for example, 30 μm to 100 μm. In outer covering can 11, can bottom 12 is pressed to provide loop-shaped thin-walled line 17 having non-coupled part 18, thereby giving can bottom valve 16.

Can bottom 12 illustrated in the sectional view of FIG. 5 is pressed to linearly thin can bottom 12, and provide thin-walled lines 17. In can bottom 12 in this figure, a part between thin-walled line 17 and an outer peripheral edge of can bottom 12 is flat surface part 19, and a sectional shape of thin-walled line 17 is a U-curved shape protruding inward outer covering can 11. Can bottom valve 16 is pressed into a conical shape, and has a chevron shape protruding inward the center. Furthermore, in can bottom valve 16 in this figure, a boundary part with thin-walled line 17 protrudes outward relative to flat surface part 19 provided on the outer peripheral part of can bottom 12. In can bottom valve 16, internal tab 23 connected to spiral electrode 20 is connected to a center part, that is, the chevron protrusion. Conical can bottom valve 16 has little distortion in a state where the internal pressure acts, and can reliably rupture entire thin-walled line 17 and reliably open largely.

Furthermore, although not illustrated, the cylindrical battery can be provided with a can bottom valve on a can bottom of an outer covering can and an exhaust valve on a sealing plate formed by closing an opening of the outer covering can. This battery module can quickly exhaust the exhaust gas from the can bottom valve and the exhaust valve provided at both ends of the cylindrical battery, and more effectively suppress an internal pressure rise of the battery.

[Lead plate 3] Lead plate 3 is a metal plate made of elastically deformable nickel, copper, or an alloy thereof, and is arranged opposing both end surfaces of the plurality of cylindrical batteries 1 in which both end surfaces are arranged on the same plane in a parallel to each other. In battery module 100 of FIG. 5, a pair of lead plates 3 are arranged in a horizontal above and below cylindrical battery 1 in the figure. The pair of lead plates 3 are arranged on the side opposing can bottom 12 of cylindrical battery 1 and the side opposing sealing plate 13, and electrically connected to protrusion electrode 15A of sealing plate 13 and bottom electrode 15B of can bottom 12 to connect adjacently arranged cylindrical batteries 1 in series or in parallel.

Lead plate 3 arranged opposing to the can near bottom includes, at a position opposing to can bottom valve 16, double-supported arm 31 having both ends coupled to lead plate 3, and gas permeation gaps 32 provided on both sides of double-supported arm 31 to permeate the exhaust gas. Furthermore, lead plate 3 in the figure includes connection arms 33 welded to can bottom 12 on both sides of double-supported arm 31, and gas permeation gap 32 is provided between double-supported arm 31 and connection arm 33. In a battery pack that allows a large current to flow, a large current value is sometimes not permitted only by a lead plate. In such a case, in order to increase a permissible current value, there is a case where a component called current collecting plate having a shape similar to that of the lead plate is further set on the lead plate. The current collecting plate can have the same mechanism as that of the lead plate.

[Double-supported arm 31] Double-supported arm 31 blocks permeation of a solid exhaust exhausted from can bottom valve 16, and gas permeation gap 32 allows exhaust gas to pass therethrough. In lead plate 3 of FIGS. 3 to 5 and 8, double-supported arm 31 is arranged elongated in the diametrical direction of circular can bottom 12, and double-supported arms 31 is arranged to oppose circular can bottom 12.

Double-supported arm 31 has such a strength with which the solid exhaust contained in the high-temperature, high-pressure exhaust exhausted from can bottom valve 16 does not collide with the inner surface and is not ruptured, for example, lateral width (W1) of the narrowest region is greater than or equal to 1 mm, preferably greater than or equal to 1.2 mm, and more preferably greater than or equal to 1.5 mm. In double-supported arm 31 of FIGS. 4 and 8, lateral width (W2) of a root part on one side (lower side in the figure) is widened, and both end parts of the root part on the opposite side are cut into a curved shape on the inner side to narrow lateral width (W1). As illustrated in the figure, lead plate 3 provided with wide part 31A by widening lateral width (W2) on one side has an advantage of being capable of more reliably blocking the permeation of the solid exhaust colliding with the inner surface of wide part 31A. In particular, as indicated by a chain line in FIG. 8, lead plate 3 has a C shape without having thin-walled line 17 in a continuous annular shape, and it is possible to more reliably block the solid exhaust exhausted from can bottom valve 16 partially coupled to can bottom 12 and having non-coupled part 18 as hinge part 25 from permeating lead plate 3. This is because by providing hinge part 25 of can bottom valve 16 at the end part on the opposite side of wide part 31A, the exhaust ejected from opened can bottom valve 16 is ejected to the inner surface of wide part 31A, and wide part 31A can more reliably block the solid exhaust from permeating lead plate 3. However, in the present invention, the shape of double-supported arm 31 is not specified to the shape illustrated in the drawing, and for example, although not illustrated, a double-supported arm having the same lateral width, a double-supported arm gradually widened toward both sides, or the like can be used.

[Gas permeation gap 32] Gas permeation gap 32 is provided between double-supported arm 31 and connection arm 33 on both sides of double-supported arm 31. Gas permeation gap 32 is set to have a lateral width that allows a gas component contained in the solid exhaust, that is, the emission gas to permeate, but does not allow a solid exhaust to permeate. Lead plate 3 in FIG. 5 has a slit shape with opening width (K) through which a solid exhaust does not pass through gas permeation gap 32. Gas permeation gap 32 is set such that opening width (K) of the widest region is less than or equal to 5 mm, preferably less than or equal to 3 mm, for example, in a lateral sectional view, in order not to allow the solid exhaust permeating lead plate 3 and having a size that causes adverse effects to permeate. If gas permeation gap 32 is too large, there is an adverse effect that a large solid exhaust permeates, but if it is too narrow, an exhaust gas cannot smoothly permeate, and thus gas permeation gap 32 is preferably set to be wider than 1 mm.

[Connection arm 33] In lead plate 3 of FIGS. 4, 5, and 8, connection arm 33 is provided on both sides of double-supported arm 31, gas permeation gap 32 is provided between double-supported arm 31 and connection arm 33, and gas permeation gap 32 is provided on both sides of double-supported arm 31. The connection arm 33 is a cantilever arm having one end coupled to lead plate 3, and has a tip welded to can bottom 12 to electrically connect lead plate 3 to can bottom 12. Cantilever connection arm 33 is welded to the outer periphery of can bottom 12 outside of thin-walled line 17 that is annular. In a state where thin-walled line 17 is ruptured and can bottom valve 16 is opened, in this structure, lead plate 3 is arranged at a fixed position of can bottom 12 by the pair of connection arms 33, and double-supported arm 31 is arranged at a fixed position by preventing positional displacement of double-supported arm 31, and permeation of the solid exhaust can be reliably blocked by double-supported arm 31.

As illustrated in FIGS. 3 and 5, lead plate 3 is arranged at a position away from the can bottom surface, and connection arm 33 is deformed so as to bring the tip end into contact with can bottom 12 and is welded to can bottom 12. Double-supported arm 31 is arranged on the same plane as lead plate 3 and arranged away from can bottom 12, and connection arms 33 is welded in contact with can bottom 12 at the tip. Lead plate 3 coupled to can bottom 12 of cylindrical battery 1 in this state has an advantage that a step is provided between double-supported arm 31 and connection arm 33, and a substantial opening area of gas permeation gap 32 is made larger than an opening area of lead plate 3 in plan view, so that the exhaust gas is allowed to more smoothly permeate. Since the exhaust gas ejected from opened can bottom valve 16 collides with the inner surface of double-supported arm 31, changes the flow into the horizontal direction, and permeates a step gap between double-supported arm 31 and connection arm 33, it is possible to suppress the exhaust gas having permeated lead plate 3 from directly colliding with the inner surface of exterior case 5 in the vertical direction. This can effectively prevent thermal failure of exterior case 5 due to the high-temperature exhaust gas having permeated lead plate 3.

INDUSTRIAL APPLICABILITY

The present invention is a battery module in which cylindrical batteries are connected by a metal lead plate, and particularly, the battery module can be suitably used as a battery module including a cylindrical battery having a can bottom valve that is ruptured and opens an exhaust port when an internal pressure of an outer covering can increases.

REFERENCE MARKS IN THE DRAWINGS

100 battery module
1 cylindrical battery
2 battery case
3 lead plate
4 battery unit
5 exterior case
10 battery can
11 outer covering can
11A bottom plate
12 can bottom
13 sealing plate
14 insulating material
15 electrode
15A protrusion electrode
15B bottom surface electrode
16 can bottom valve
17 thin-walled line
18 non-coupled part
19 flat surface part
20 spiral electrode
21 electrode plate
22 separator
23 internal tab
25 hinge part
31 double-supported arm
31A wide part
32 gas permeation gap
33 connection arm

The invention claimed is:
1. A battery module comprising:
a plurality of cylindrical batteries; and
a lead plate connected to the plurality of cylindrical batteries and electrically connecting the plurality of cylindrical batteries to each other,
wherein
each of the plurality of cylindrical batteries includes a can bottom valve including a thin-walled line that is ruptured and opens an exhaust port when an internal pressure of an outer covering can becomes higher than a threshold pressure, and
the lead plate includes
a double-supported arm arranged opposing the can bottom valve at a can bottom of a corresponding one of the plurality of cylindrical batteries, wherein the double-supported arm is free of direct contact with the can bottom and coupled to a rest of the lead plate at both ends of the double-supported arm, and
a gas permeation gap for exhaust gas ejected from the exhaust port disposed on both sides of the double-supported arm.
2. The battery module according to claim 1, wherein the double-supported arm is arranged elongated in a diametrical direction of the can bottom of a circular shape.

3. The battery module according to claim 1, wherein the lead plate includes connection arms provided by welding to the can bottom on both sides of the double-supported arm, the gas permeation gap is provided between the double-supported arm and each of the connection arms, and each of the connection arms is a cantilever arm with one end coupled to the lead plate, and includes a tip welded to the can bottom.

4. The battery module according to claim 3, wherein each of the connection arms is welded to the can bottom outside a thin-walled line that is annular.

5. The battery module according to claim 1, wherein each of the cylindrical batteries includes a can bottom valve on the can bottom of the outer covering can and a exhaust valve on a sealing plate formed by closing an opening of the outer covering can.

6. The battery module according to claim 1, wherein a lateral width of the double-supported arm is greater than or equal to 1.5 mm.

7. The battery module according to claim 1, wherein an opening width (K) of the gas permeation gap in plan view is less than or equal to 5 mm.

8. The battery module according to claim 1, wherein each of the cylindrical batteries is a non-aqueous electrolyte secondary battery.

9. A battery module comprising:

a plurality of cylindrical batteries; and a lead plate connected to the plurality of cylindrical batteries and electrically connecting the plurality of cylindrical batteries to each other, wherein each of the plurality of cylindrical batteries includes a can bottom valve including a thin-walled line that is ruptured and opens an exhaust port when an internal pressure of an outer covering can becomes higher than a threshold pressure, the lead plate includes a double-supported arm arranged opposing a can bottom of a corresponding one of the plurality of cylindrical batteries and coupled to the lead plate at both ends at a position opposing the can bottom valve, and a gas permeation gap for exhaust gas ejected from the exhaust port disposed on both sides of the double-supported arm, the lead plate includes connection arms provided by welding to the can bottom on both sides of the double-supported arm, the gas permeation gap is provided between the double-supported arm and each of the connection arms, and each of the connection arms is a cantilever arm with one end coupled to the lead plate, and includes a tip welded to the can bottom.

10. The battery module according to claim 9, wherein the double-supported arm is arranged elongated in a diametrical direction of the can bottom of a circular shape.

11. The battery module according to claim 9, wherein each of the connection arms is welded to the can bottom outside a thin-walled line that is annular.

12. The battery module according to claim 9, wherein each of the cylindrical batteries includes a can bottom valve on the can bottom of the outer covering can and a exhaust valve on a sealing plate formed by closing an opening of the outer covering can.

13. The battery module according to claim 9, wherein a lateral width of the double-supported arm is greater than or equal to 1.5 mm.

14. The battery module according to claim 9, wherein an opening width (K) of the gas permeation gap in plan view is less than or equal to 5 mm.

15. The battery module according to claim 9, wherein each of the cylindrical batteries is a non-aqueous electrolyte secondary battery.

* * * * *